United States Patent [19]

St-Germain

[11] Patent Number: 5,318,481
[45] Date of Patent: Jun. 7, 1994

[54] LEVITATING APPARATUS

[75] Inventor: Jean St-Germain, St-Simon de Bagot, Canada

[73] Assignee: Aerodium International LTÉE, Laval, Canada

[21] Appl. No.: 95,196

[22] Filed: Jul. 23, 1993

[51] Int. Cl.⁵ .............................................. A63J 5/12
[52] U.S. Cl. ........................................ 472/68; 472/80
[58] Field of Search ................... 472/68, 80, 49, 131, 472/133; 104/80-82

[56] References Cited

U.S. PATENT DOCUMENTS

| | | | |
|---|---|---|---|
| 612,090 | 10/1898 | Conquest | 472/80 |
| 1,229,519 | 6/1917 | Rach | 472/80 |
| 3,270,441 | 8/1963 | Hewes | 472/80 X |
| 3,476,385 | 11/1969 | Foy | 472/80 |
| 4,244,136 | 1/1981 | Kublan | 472/80 X |
| 4,244,566 | 1/1981 | Molovinsky | 472/68 |
| 4,392,648 | 7/1983 | Foy | 472/80 |
| 4,527,351 | 7/1985 | Gerakiteys | 472/68 X |

Primary Examiner—Carl D. Friedman
Assistant Examiner—Beth A. Aubrey
Attorney, Agent, or Firm—Pierre Lespérance; Francois Martineau

[57] ABSTRACT

A propeller is mounted within a shroud to produce an upwardly moving air flow to levitate human beings. The user wears an air inflatable suit and a harness. A couch is disposed just outside the shroud to support the user in prone position. A jib crane is positioned near the couch and shroud and carries a self-winding reel to which a strap is attached at one end, the other end of the strap carrying a hook which is attached to the harness at the back of the user. The jib crane lifts the user off the support through the strap and translates the same above the shroud within the air flow being suspended by the strap in prone position. When the user is levitated by the air flow, the reel automatically reels in the strap.

15 Claims, 6 Drawing Sheets

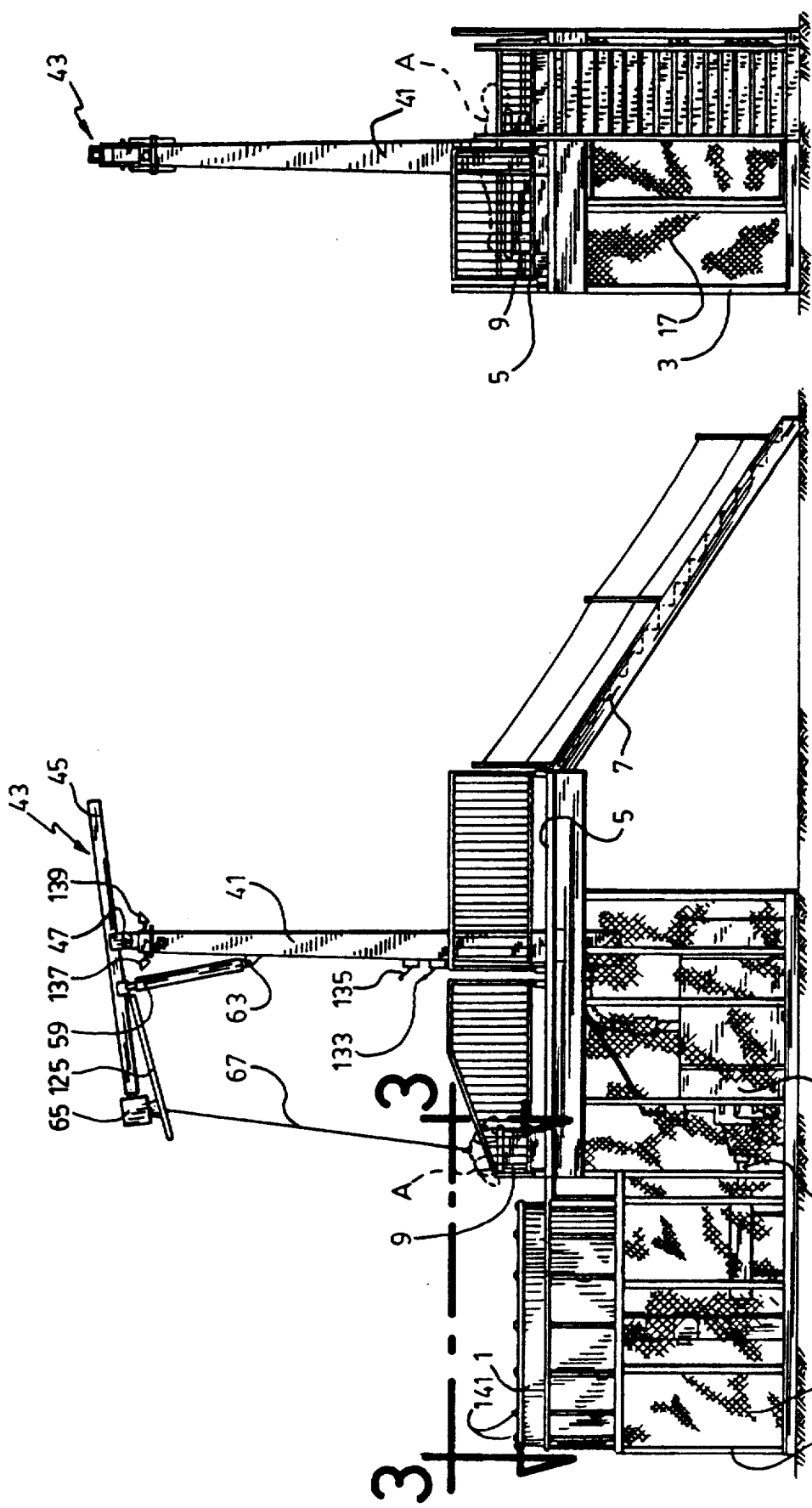

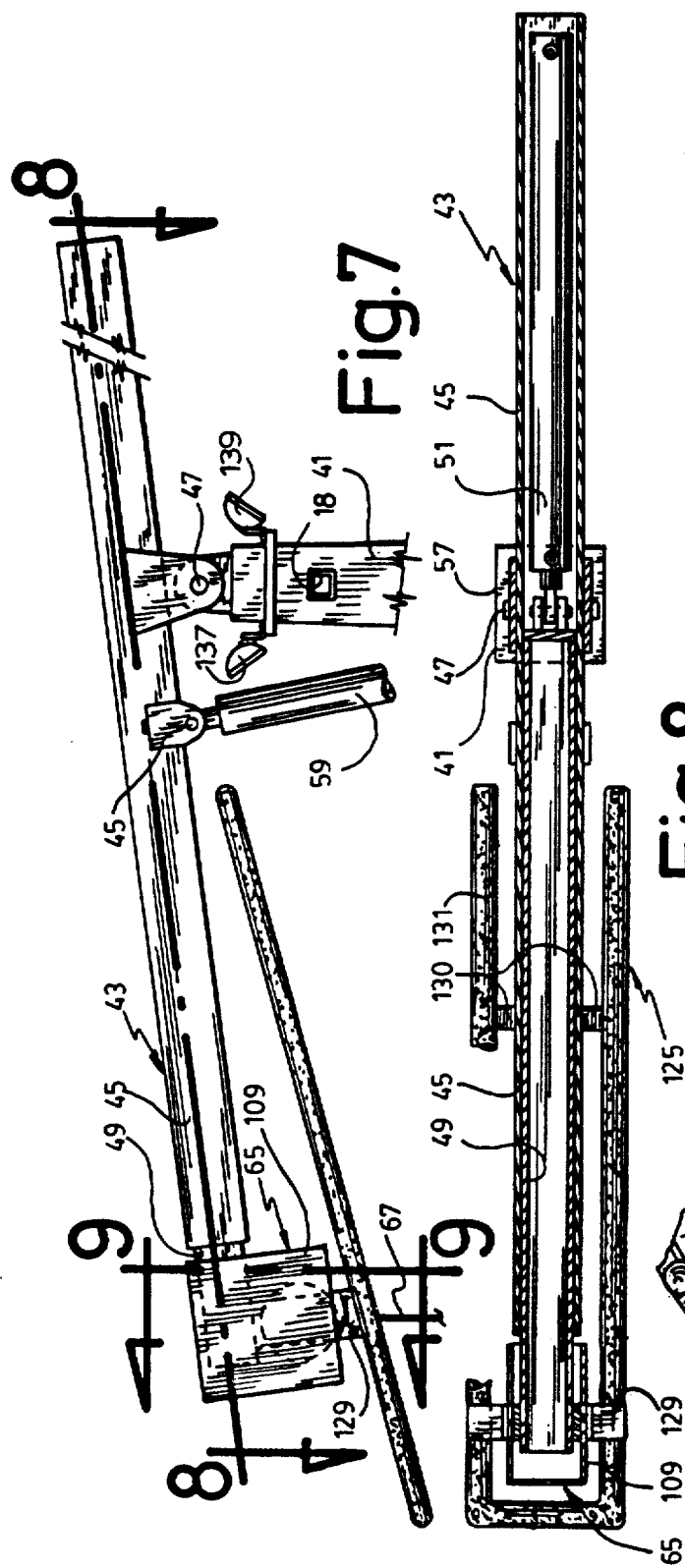

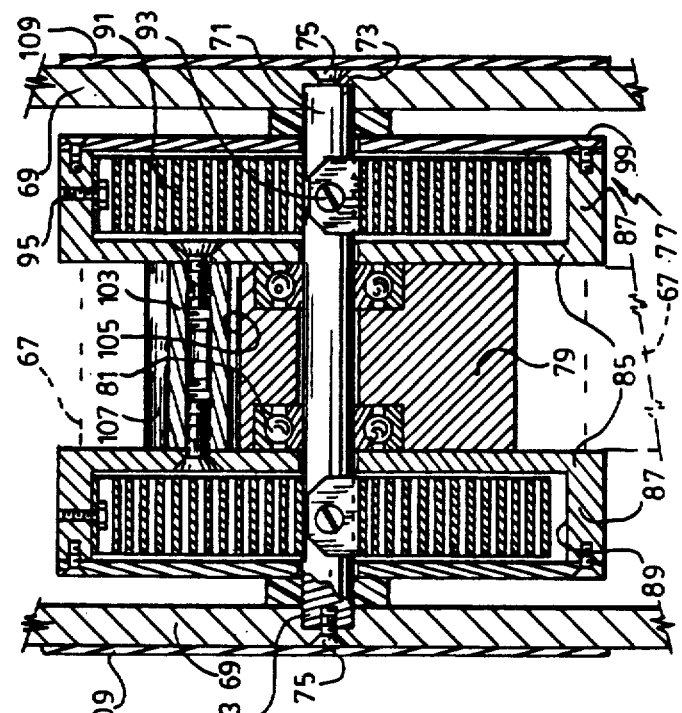
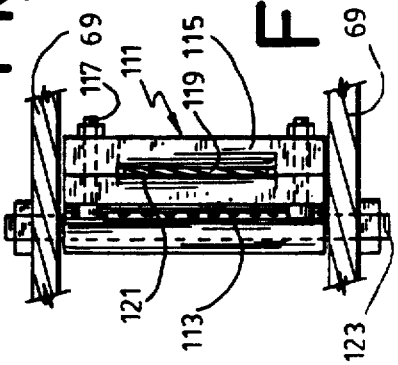
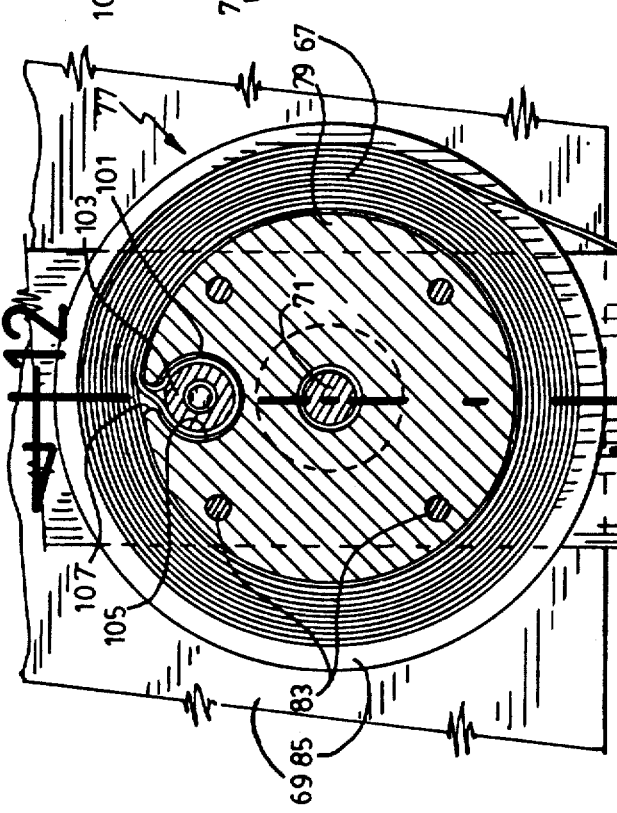
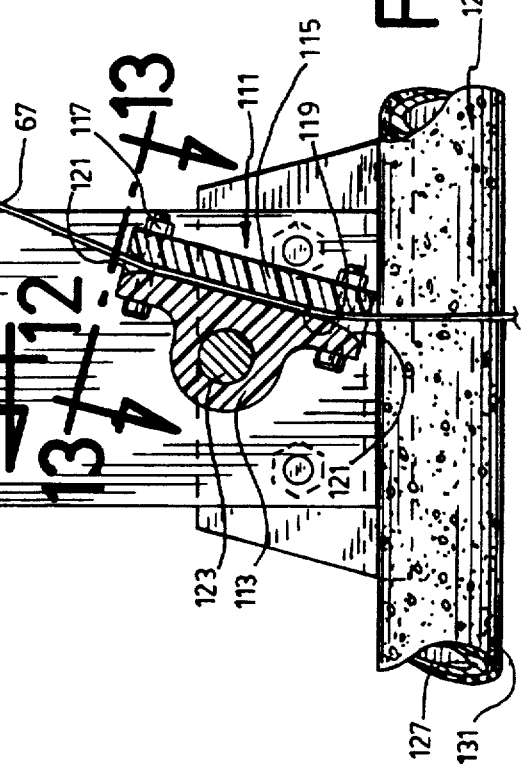

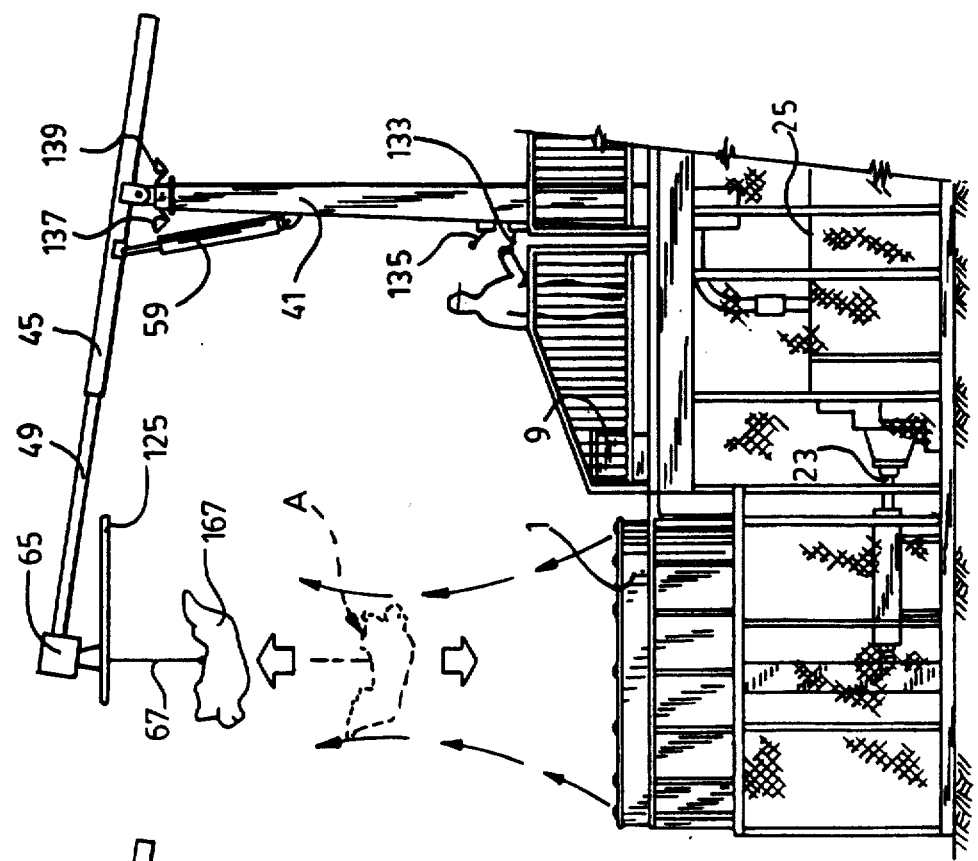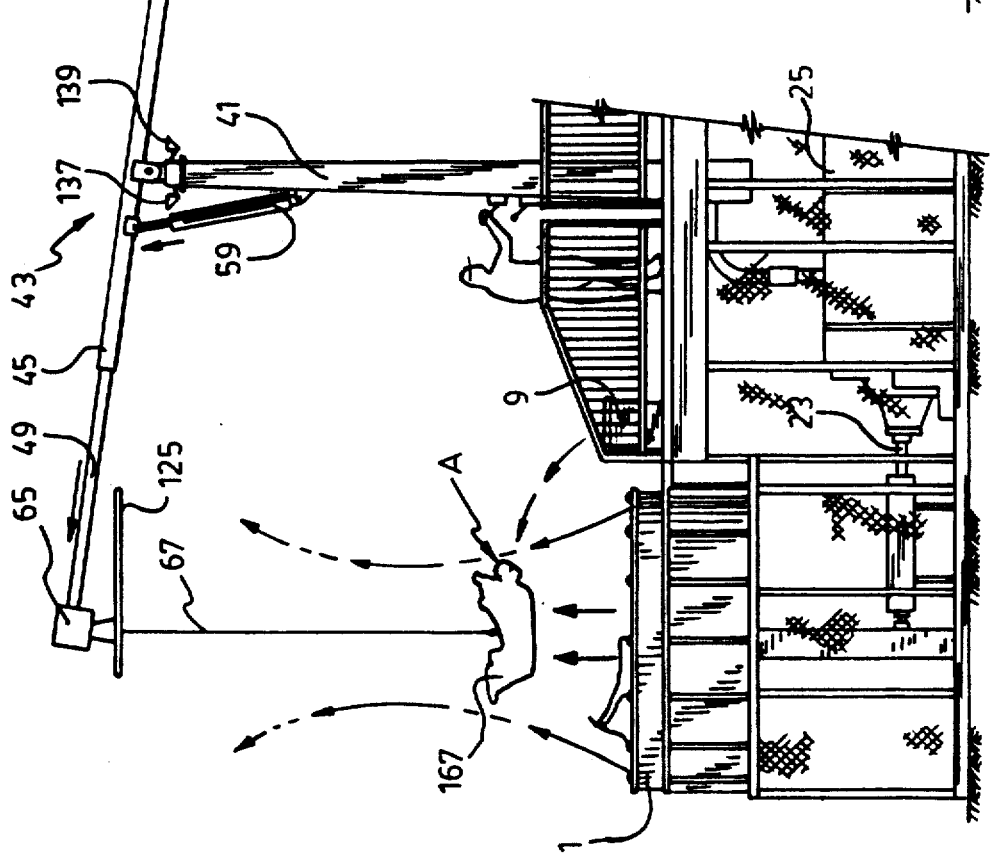

LEVITATING APPARATUS

FIELD OF THE INVENTION

The present invention relates to an apparatus to levitate human beings by an upward flow of air either for the sole fun and enjoyment of the users and spectators or for training such as to practice free fall by parachutists.

BACKGROUND OF THE INVENTION

In applicant's prior U.S. Pat. No. 4,457,509 dated Jul. 3, 1984 and entitled "LEVITATIONARIUM FOR AIR FLOTATION OF HUMANS" there is described an installation to levitate human beings including a specifically designed building wherein the upward flow, upon reaching the top of the building, is caused to return through an annular air passage to the underside of the air propeller so that the air circulates in a closed circuit. Such a building is necessarily expensive to build together with the accompanying air propelling installation and, moreover, it cannot be moved from one site to another. Moreover several users levitated at the same time often hit themselves and may suddenly drop on the safety net above the air propeller, sometimes resulting in injuries.

OBJECTS OF THE INVENTION

The main object of the present invention resides in the provision of a levitation apparatus for human beings which will obviate the above-noted disadvantages in that it is a less expensive and much simpler installation than that of the above-noted U.S. patent, in that users can use it only one at a time and in that the apparatus is designed to be transported from one site to the other.

Another object of the present invention resides in the provision of an apparatus of the character described provided with safety means to prevent injury to the user.

Another object of the present invention resides in the provision of an apparatus of the character described which is simple to operate.

SUMMARY OF THE INVENTION

The present invention defines a shroud means having a vertical axis with a lower air inlet and an upper air outlet, air blower means within said shroud means for propelling air upwardly and thus form an upwardly moving air flow above said shroud means. Support means outside said shroud means and air flow for supporting a user; harness means worn by the user; crane means; self-winding reel means carried by said crane means; strap means attached to said reel means and to said harness means at the back of said user; said crane means operative to lift said user off said support means through said strap means and translate the same above said shroud means within said air flow by said strap means in prone position, said strap means automatically reeled in by said reel means upon levitation of said user by said upward air flow.

Preferably, an open support structure supports the shroud means above ground and both the air inlet and outlet open to the atmosphere. The air blower means includes an air propeller mounted for rotation about a vertical axis within said shroud means and driven by an internal combustion engine located within said supporting structure. A platform is mounted above the internal combustion engine. The support means is a couch on which the user can lie in prone position ready to be lifted by said crane means and translated while in prone position over said shroud within said upward air flow. Preferably, the crane means include a mast mounted on said platform and a telescopic arm including a main section pivoted for up and down movement on the top of said mast and a telescopic section movable inwardly and outwardly of main section. Said self-winding reel means is carried by the outer end of said telescopic section. Hydraulic rams raise and lower and telescope said telescopic arm inwardly and outwardly. Preferably, the entire structure can be dismantled in modular units to be transported from one site to another. The reel means include a spool with cup-shaped sides in each of which a spirally wound leaf spring is mounted and enclosed. A guide system prevents the strap from the being wound on the reel in twisted condition.

BRIEF DESCRIPTION OF THE DRAWINGS

FIG. 1 is a side elevation of the apparatus of the invention;

FIG. 2 is an end view of the same;

FIGS. 5 and 6 are partial plan views of the grating system at the top of the shroud and taken within area 5 and area 6 respectively of FIG. 3;

FIG. 7 is a partial elevation of the top portion of the crane showing the lifting arm carrying the self-winding reel and the bumper;

FIG. 8 is a longitudinal section taken along line 8—8 of FIG. 7;

FIG. 10 is a cross-section of the reel and of the strap guide taken along line 10—10 of FIG. 9;

FIG. 12 is a cross-section of the self-winding reel taken along line 12—12 of FIG. 10;

FIG. 13 is an end view of the strap guide taken along line 13—13 of FIG. 10;

FIGS. 14 and 14a are partial elevations of the apparatus at various stages of its operation.

DETAILED DESCRIPTION OF THE PREFERRED EMBODIMENT

Figure 3:
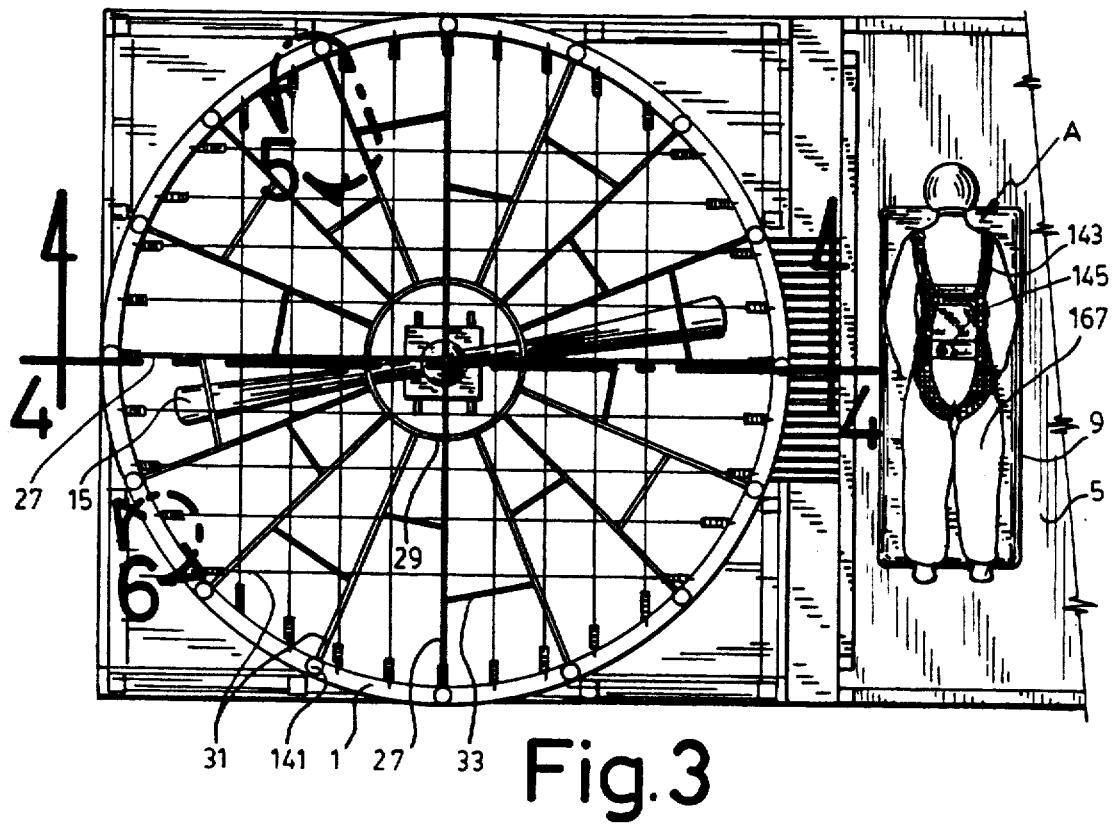
FIG. 3 is a partial top plan view taken along line 3—3 of FIG. 1.

The apparatus is generally shown in FIGS. 1 and 2 and comprises a cylindrical shroud 1 supported above ground by an open support structure 3 which also supports, besides the shroud 1, a fenced platform 5 accessible by a stairway 7; a couch 9 is mounted on platform 5 adjacent shroud 1 but on the outside thereof and serves to support a user A in prone position (face amd belly down and body and legs straight).

Figure 4:
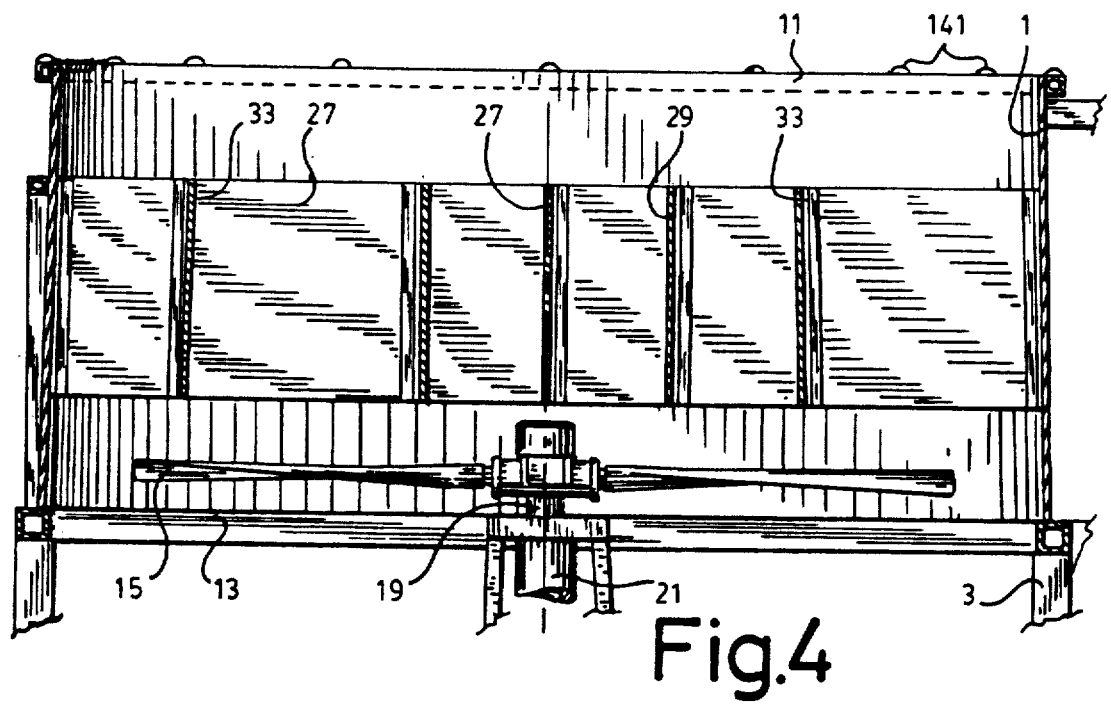
FIG. 4 is a partial vertical section taken along line 4—4 of FIG. 3.
Figures 9, 11:
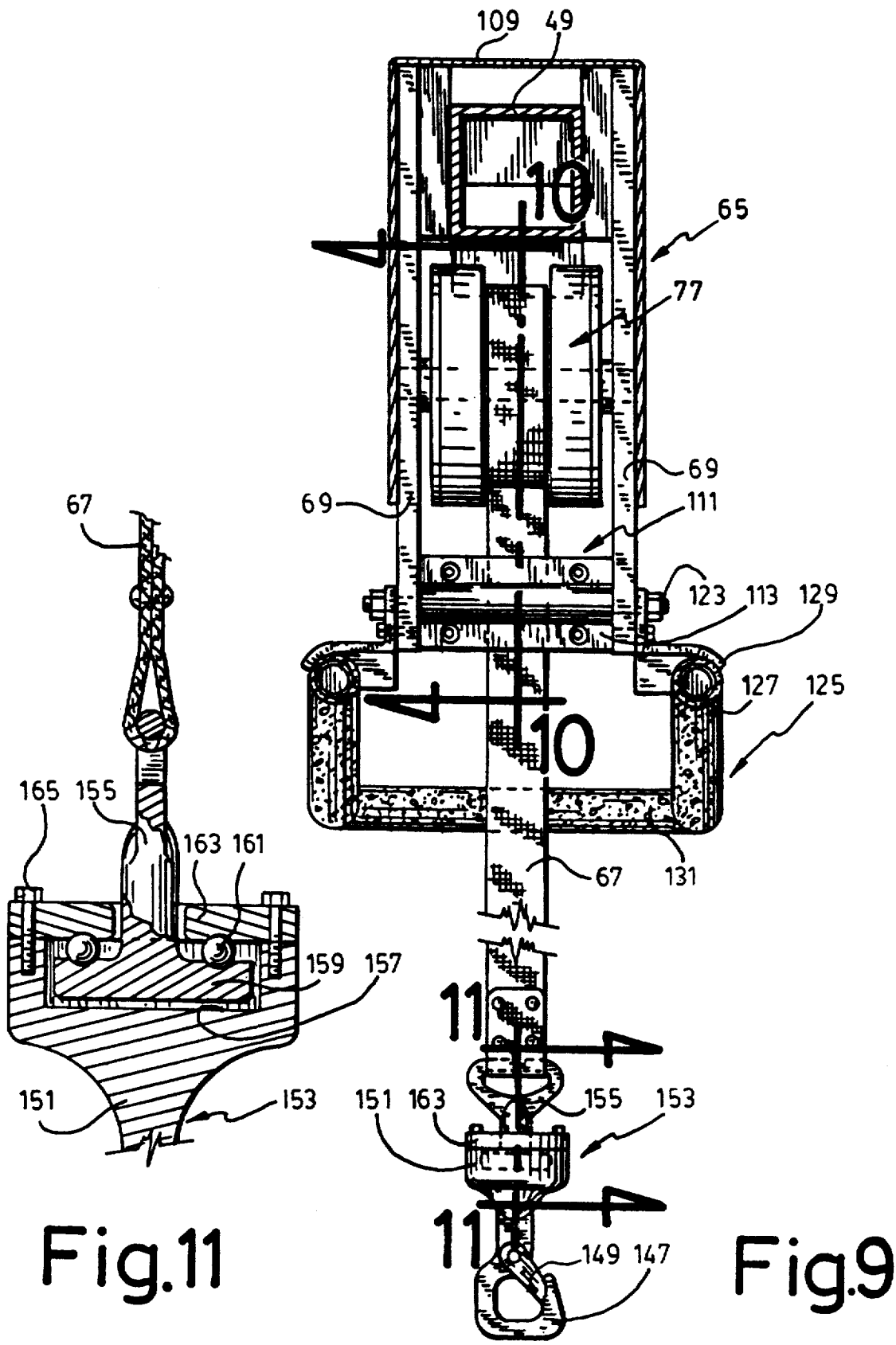
FIG. 9 is a cross-section on an enlarged scale taken along line 9—9 of FIG. 7.
FIG. 11 is a section of the rotary joint between the strap and the hook taken along line 11—11 of FIG. 9.

As shown in FIGS. 3 and 4, the shroud 1 is generally cylindrical and disposed with its axis vertical defining an upper air outlet 11 and a lower air inlet 13. An air blower means, namely aircraft propeller 15 is mounted co-axial with the shroud 1 at the bottom of the latter and rotates in a direction to produce an upward air flow issuing to the atmosphere through air outlet 11 and above shroud 1. The air from the atmosphere is sucked into the air inlet 13 through the screen 17 (see FIGS. 1 and 2) extending between the spaced posts which define the support structure 3.

The drive shaft 19 of propeller 15 is rotatably supported by journals in a vertical tube 21 and is connected through an angle box to the horizonal drive shaft 23 of a large capacity internal combustion engine 25 which is normally disposed under platform 5. The upward air flow produced by the propeller 15 is guided by a network of guide plates consisting of two main guide plates 27 intersecting at right angles to each other and supporting a central cylindrical guide plate 29 from which radially outwardly extends a plurality of radial guide plates 31. The guide plates 27 and 31 are secured at their outer end to the shroud 1 intermediate the ends thereof. Radial guide plates 31 are further interconnected by transverse guide plates 33; the latter together with the shroud 1 are slightly upwardly converging to define an inclination of a total of about 12.5 degrees so as to cause upward convergence of the air flow produced by the shroud. The network of guide plates prevents air turbulence and air vortex above the shroud 1. As shown in FIGS. 3, 5, and 6, a safety net or grating 35 including intersecting wires 37 and tension springs 39 is disposed across the upper air outlet 11 of shroud 1 with the springs 39 holding the wires 37 under tension and attached to the top edge of shroud 1.

A jib crane is provided to lift the user off couch 9 and suspend the same over the upward air flow produced above shroud 1. This crane includes a mast 41 secured to platform 5 and a telescopic lifting arm 43 carried by the top of mast 41. Lifting arm 43 includes a main section 45 which is pivoted intermediate its ends at 47 to the top of mast 41 for up and down movement. A telescopic arm section 49 is slidable within tubular main section 45 under the action of a double-acting hydraulic ram 51 which also extends within the tubular main section 45, one end 53 being attached to the corresponding end of main section 45 and the other end being pivotally connected at 57 to the inner end of telescopic section 49. The lifting arm 43 can be raised and lowered by means of a double-acting hydraulic ram 59 pivoted to the main section 45 at 61 and to the mast 41 at 63. The outer end of telescopic section 49 carries a reel assembly 65 from which issues a strap 67 adapted to be attached to the user lying on couch 9. Lifting arm 43 is pivoted between a lowered position as shown in FIG. 1, the arm downwardly inclined towards the reel assembly 65 and an upper position shown in FIGS. 14 and 14a in which the arm is upwardly inclined towards reel assembly 65. In the lowered position, the lifting arm 43 extends about 10 degrees below and 10 degrees above horizontal in its lowered and raised positions respectively.

Referring to FIGS. 9 to 15, the reel assembly 65 includes a pair of generally vertical support plates 69 secured to each side of telescopic section 49 and supporting a transversely extending shaft 71, the ends of which enter cavities 73 made in the support plates 69 and are firmly secured therein by bolts 75. A reel 77 is mounted for free rotation on shaft 71; reel 77 includes a central cylindrical hub 79 mounted on shaft 71 by roller bearings 81 and to which are attached, by means of bolts 83, two cup-shaped sides 85, each of which includes a cylindrical peripheral flange 87 and, therefore, each side 85 defines a cavity 89 in which is located a leaf spring 91 which is spirally wound with its inner end attached by bolt 93 to the shaft 71 and its outer end attached by a bolt 95 to the flange 87. Each cavity 89 is closed by a disc-shaped coover 97 by means of bolts 99 in order to protect leaf spring 91. The two leaf springs 91 are wound in the same direction and act in parallel to impart to the reel a strap winding force which is well balanced on each side of the reel and which is sufficient to automatically wind the strap 67 and keep it taut at all times despite its weight and length.

Strap 67 is of the same type as those used as passenger safety straps in automobiles.

The strap 67 is wound flat around hub 79 with its inner end 101 in the form of a loop surrounding a cylindrical anchoring block 103 which fixed within a cylindrical transverse cavity 105 made in hub 79 and communicating with the surface of said hub through a slit 107. The edges of the slit 107 are rounded so as not to fray the portion of the strap 67 entering slit 107.

A box-shaped cover 109 extends over reel 77 and plates 69 to protect reel 77 against the weather. A strap guide 111 extends across the two support plates 69 and is supported thereby to guide the strap and ensure its proper reeling and unreeling without twisting. The strap guide 111 includes a main body 113 to which is removably fixed a plate 115 by means of bolts and nuts 117. The body 113 and plate 115 form between themselves a flat strap passage 119 with rounded outer top and bottom edges 121. Passage 119 is such as to slidably receive the strap 67. Body 113 is pivotally mounted for free rotation about a cross-shaft 123 which extends between and is supported by and secured to the two support plates 69 being parallel to and vertically disposed below the support shaft 71 of the reel 77. Passage 119 is spaced from the axis of shaft 123 as shown in FIG. 10 such that the guide 111 will automatically pivot from a nearly vertical passage position when the strap is completely unreeled to an inclined position when the strap is completely reeled in. The strap guide automatically takes a position such that the strap will make a minimum bend at the top and bottom rounded edges 121 so as to minimize strap wear.

A U-shaped bumper 125 comprises a U-shaped metallic tube 127 and a covering 131. The legs of the tube 127 are secured by brackets 129 to the lower ends of the support plates 59 and are interconnected by a link 130. Covering 131 is a shock-absorbing material such as plastic foam.

The bumper 125 is therefore fixed to the lifting arm 43 but extends at an angle therewith of about 10 degrees so that the bumper 125 is substantially horizontal when the lifting arm is in raised position as shown in FIG. 14.

A first control lever 133 mounted on the mast 1 at a position accessible for a standing operator serves to control the acceleration and deceleration of the internal combustion engine 25 and, therefore, the velocity of the upward air flow. A second control lever 135 is connected in a hydraulic circuit of conventional construction for operating the two hydraulic rams 51 and 59 in sequence from a hydraulic pump driven by the engine 25. With the arm in lowered position and the telescopic section 49 retracted, namely the position of FIG. 1, operating the control lever 135 in one direction causes first lifting of the arm and then extension of the telescopic section. Control lever 135, when operated in the opposite direction, first causes retraction of the telescopic section and then lowering of the lifting arm.

The device can be operated at night, there being lights 137 and 139 mounted on the top of the mast for lighting the platform 5 and stairway 7 together with the couch 9. Also, light 137 reflects on a series of mirrors 141 secured all around the top edge of the shroud 1 to indicate to the user the approximate cross-sectional area of the air flow within which he has to maneuver.

As shown in FIG. 7, the exhaust of engine 25 exits at 18, at the top of mast 41, well above the operators on platform 5 and out of the user's harm. The user A wears a harness 143 of the type similar to those used by parachutists, said harness extending between the legs and around the shoulders and the waist and provided at the back with a connector part 145 formed of a tab with an eyelet (FIG. 3) adapted to be removably connected to a hook 147 which forms the other releasable connector part (see FIG. 9). The hook 147 has a safety tongue 149, spring pressed in closed position. Preferably the hook 147 depends from the female part 151 of a rotary joint 153. The male part 155 of said joint is attached to the outer end of the strap 67. The male part enters a cavity 157 of female part 151 and is formed with a head 159 forming one ball race for ball bearings 161 engaging and overlying a ball race 163 in the form of an annular member fixed by bolts 165 to the top of female part 151.

Harness connector part 145 is adjusted to lie at the user center of gravity.

The apparatus operates as follows:

The engine 25 is started and first driven at low speed; the user wears harness 143 on top of an air-inflatable suit 167. Hook 147 is attached to the eyelet 145 at the back of the harness 143. The user then lays belly down in prone position on the couch 9. The length of the strap 67 is such that with the lifting arm in lowered position as shown in FIG. 1, the strap is completely unreeled from reel 77 and springs 91 keep strap 67 substantially taut. The lifting arm 43 is then lifted and its telescopic section 49 extended by operating lever 135. Strap 67 raises the user off the couch and transports the same in suspended prone position over the shroud 1 within the upward air flow, as shown in FIG. 14.

The velocity of the air flow is then increased with the operator actuating the first control lever 133. The user is levitated as shown in FIG. 14a and he can maneuver up and down and sideways by effecting proper body movements; should he raise too fast, he will strike bumper 125 without any harm; should he drop, the strap 67 and reel 71 will stop him well above safety net 35.

During upward and lowered levitation movement, the strap 67 is always kept taut by the self-winding reel 77. The user can make rotary movements without the strap becoming twisted due to the presence of the rotary joint 153. Even if the strap becomes twisted due, for instance, to the action of the wind on the same, the strap will be positively guided by the strap guide 111 and thus always wind itself on the reel 77 without any twist. Should the strap or reel fail and the user allowed to drop, he will land on the safety net 35 without any injuries.

The apparatus is arranged in a plurality of modular units of such a size and weight that it can be transported from one site to another, for instance on a roadway float.

I claim:

1. A levitation apparatus for air flotation of humans comprising shroud means having a vertical axis with a lower air inlet and an upper air outlet; air blower means within said shroud means for propelling air upwardly through said shroud means and thus form an upwardly moving air flow above said shroud means; support means outside said shroud means and said air flow for supporting a user; harness means worn by said user; crane means; self-winding reel means carried by said crane means; strap means attached to said reel means and to said harness means at the back of said user, said crane means operative to lift said user off said support means through said strap means and translate the same above said shroud means within said air flow, suspended by said strap means in prone position, said strap means automatically reeled in by said reel means upon levitation of said user by said air flow.

2. An apparatus as defined in claim 1, wherein said support means includes a couch disposed adjacent said shroud means but outside the same adapted to support a user in prone position.

3. An apparatus as defined in claim 2, wherein said harness means carries a first connector part which is located at the back of said user and substantially at the centre of gravity of the same when said harness is worn by said user.

4. An apparatus as defined in claim 3, wherein said strap means include a strap having a second connector part at its free end which is releasably connectable with said first connector part, the other end of said strap being attached to said reel means.

5. A levitation apparatus as defined in claim 4, further including a strap guide means disposed below said reel means including a member defining a narrow flat passage through which said strap slidably moves, said part pivoted to said crane means about an axis laterally spaced from said passage whereby said member pivots about said axis as the number of turns of said strap on said reel means varies whereby said passage tends to orient itself in as close alignment as possible with the tangent of the outermost turn of said strap on said reel means.

6. An apparatus as defined in claim 4, wherein said reel means includes a shaft carried by said crane means, a spool freely rotatable on said shaft, said strap attached at one end to said spool and a leaf spring attached to said shaft at one end and to said spool at the other end, said leaf spring coiled in a spiral.

7. An apparatus as defined in claim 6, further including a strap guiding means carried by said crane adjacent said spool for guiding said strap around said spool while preventing twisting of said strap on said spool.

8. An apparatus as defined in claim 7, further including a rotary coupling intermediate said strap outer end and said second connector part to allow said levitated user and said first and second connector parts to rotate with respect to said strap.

9. An apparatus as defined in claim 7, further including bumper means fixed to said crane and disposed around said strap below said reel means and preventing the levitated user from contacting said reel means.

10. An apparatus as defined in claim 9, further including a safety net fixed across the air outlet of said shroud means for supporting a user above said air blower means.

11. A levitation apparatus as defined in claim 2, wherein said crane means includes a mast, a telescopic lifting arm having a main section pivotally carried by the top of said mast for up and down movement and a telescopic section movable inward and outward of said main section, said self-winding reel means carried by the outer end of said telescopic section and further including first power means to actuate said blower means, second power means to raise and lower said lifting arm on said mast and third power means to extend and retract said telescopic section relative to said main section, said strap means fully unreeled and generally taut when attached to said harness means worn by a user in prone position on said couch and with said arm in lowered position and said telescopic section in retracted position, lifting of said lever and extension of said telescopic section causing said user to be lifted off said couch while in prone position and suspended in said air flow, said reel automatically reeling in said strap as said user is levitated by said air flow.

12. An apparatus as defined in claim 11, wherein said air blower means is an air propeller rotatably mounted within and co-axial with said shroud means for rotation about a vertical axis, said first power means including an internal combustion engine having a driving shaft connected to said propeller, said second power means including a first telescopic double-acting telescopic ram pivotally connected to said mast and to said main section of said arm and said third power means including a second double-acting hydraulic ram located within said main section and connected to the same at one end and to said telescopic section at the other end.

13. A levitation apparatus as defined in claim 12, wherein said shroud means is supported above ground through an open structure which communicates said air inlet with the atmosphere, said air outlet opening directly to the atmosphere.

14. A levitation apparatus as defined in claim 13, wherein said structure supports a platform above ground and said couch is mounted on said platform together with said mast, said internal combustion engine being located underneath said platform.

15. A levitation apparatus as defined in claim 1, wherein said reel means includes a shaft, a spool freely rotatable on said shaft, said spool including a cylindrical part on which said strap means is wound and two cup-shaped sides radially outwardly protruding from said cylindrical hub, each side including a peripheral cylindrical flange, a spirally coiled leaf spring located within each cup-shaped side, having an inner end secured to said shaft and an outer end secured to said peripheral flange and a cover fixed to said peripheral flange and closing the cavity in which each leaf spring is located.

* * * * *